Patented July 29, 1924.

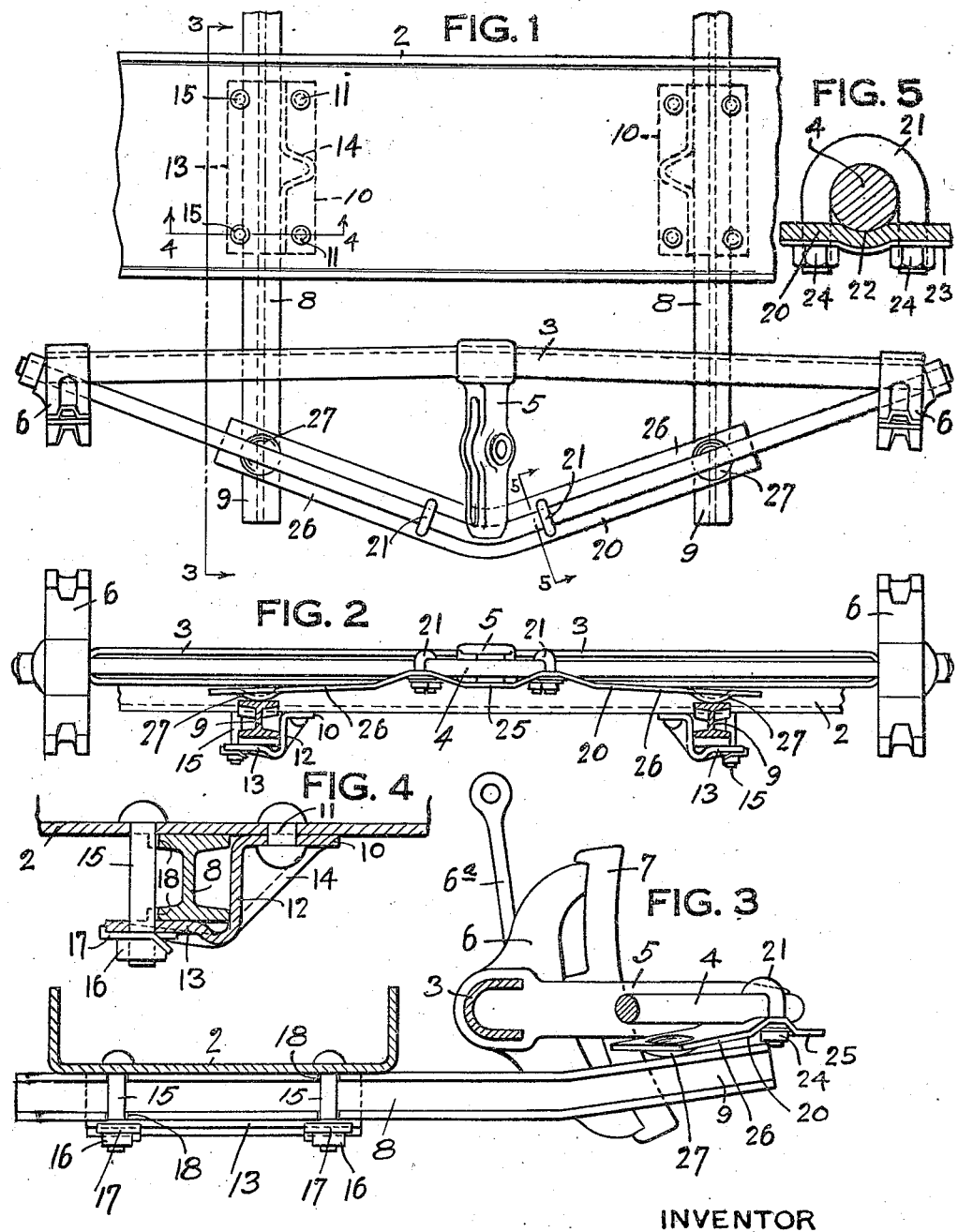

1,503,045

UNITED STATES PATENT OFFICE.

SOREN HANSSON, OF BUTLER, PENNSYLVANIA, ASSIGNOR OF ONE-HALF TO HARRY T. ANDERSON, OF BUTLER, PENNSYLVANIA.

FOUR-POINT FLEXIBLE SUPPORT AND SAFETY DEVICE FOR RAILWAY BRAKES.

Application filed April 26, 1923. Serial No. 634,875.

*To all whom it may concern:*

Be it known that I, SOREN HANSSON, a citizen of the United States, and resident of Butler, in the county of Butler and State of Pennsylvania, have invented a new and useful Improvement in Four-Point Flexible Support and Safety Devices for Railway Brakes; and I do hereby declare the following to be a full, clear, and exact description thereof.

My invention relates to brake-rigging for railway cars and its object is to provide an improved four-point flexible support and safety device for holding up the brake-rigging in case of failure of the brake hangers.

An additional object of my invention is to provide a flexible suspension and safety device which shall operate in an improved manner to equalize the action of the brake heads under normal operating conditions.

My improved device consists, in general, of a two-armed spring member secured to the brake beam near its transverse center and having its free ends provided with sliding shoes which rest upon rigid supporting arms carried by the spring plank of the truck and extending beneath the brake beam. The spring member arranged in this manner provides flexible support for the brake beam if the brake hangers should fail, and also exerts an effect on the brake beam which tends to equalize the action of the brakes if one of the brake heads should be heavier than the other.

In the accompanying drawing Fig. 1 is a plan view of so much of the brake-rigging of a railway car as is necessary to illustrate my invention as applied to a trussed brake beam; Fig. 2 is a front elevational view of the brake beam and safety support, with the safety bars in section; Fig. 3 is a side view partly in elevation and partly in section on the line 3—3, Fig. 1; Fig. 4 is a detail vertical sectional view on the line 4—4, Fig. 1; and Fig. 5 is a detail vertical sectional view on the line 5—5, Fig. 1.

In the drawing the numeral 2 indicates the usual spring plank of a car truck, beside which is a trussed brake beam consisting of a compression member 3 and a tension member 4, and having the usual strut 5 and brake heads 6 which carry the shoes 7. One of the usual brake hangers is shown at 6ª. These parts are all of ordinary construction.

Secured beneath the spring plate 2 in the manner shown in detail in Fig. 4 are two rigid safety bars 8, the ends of which extend to a position beneath the brake beams, and are there bent upwardly as shown at 9, Fig. 3. As shown in the drawing, the bars 8 are I-beams, but they may be channels, Z-bars or other rolled shapes, as desired.

Each of the safety bars 8 is carried beneath the sprink plank 2 in an open-sided bracket or housing consisting, as best shown in Figs. 1 and 4, of a horizontal plate 10 secured beneath the spring plank 2 by means of rivets 11, and having a vertical portion 12 and a lower horizontal portion 13, which form a seat for the safety bar 8. A reinforcing rib may be formed in the bracket, as shown at 14. Two bolts 15 extend through openings in the spring plank and in the lower horizontal portion 13 of the housing, and are secured in place by nuts 16 and nut locks 17. The safety bar 8 is provided with notches 18 cut in its upper and lower flanges and fitting around the bolts 15. These bolts therefore prevent the safety bar 8 from moving either lengthwise or sidewise, and even if the nuts 16 should become detached the bolts will remain in position and will keep the safety bar from being displaced. At the same time, the bolts may be readily removed when it is desired to shift the safety bar for the purpose of replacing the brake shoes or otherwise repairing or adjusting the brake-rigging.

The bent tension member 4 of the brake beam carries a spring member 20 which is bent to the shape of the tension member 4, as shown in Fig. 1, and is secured to the tension member on opposite sides of its center by means of U-bolts 21, as shown in Figs. 1 and 5. The spring member 20 is provided with depressions 22 to fit the tension member 4 at the points of connection with the tension member, and lock-nuts 23 are provided to secure the nuts 24 to the U-bolts 21.

As shown at 25 in Fig. 2, the mid-portion of the spring member 20 is depressed to clear the strut 5, while the ends 26 of the spring member 20 are inclined downwardly away from the tension member 4 and are provided near their free outer ends with circular depressions 27 which form chairs or shoes resting upon the upper surfaces of the safety bars 8.

The strength and camber of the spring member 20 are so selected that the chairs 27 normally rest with slight pressure on the safety bars 8. This pressure remains substantially constant as the brake shoes wear away on account of the upward slant of the ends 9 of the safety bars 8. In the normal correct operation of the brake-rigging the spring device slides on the bars 8 and guides the brake beam in its braking movement, but if one of the brake-heads is heavier than the other the spring member tends to equalize such unequal weight and to produce equal braking effects. If the brake-hangers should fail and let the brake rigging drop, the safety bars 8 are in position to hold up the brake-rigging and the spring member 20 then serves as a cushion for the brake-rigging as it rests on the safety bars.

It will be observed that the spring member 20 is attached to the brake beam near the center of the beam, as in a third-point suspension, but exerts its effect between the center of the beam and its ends, so that my device may be considered as a combination of a third point suspension and a fourth-point suspension.

My invention is not restricted to the precise details of construction shown in the accompanying drawing, but may be applied to many different types of brake beams, and may be constructed in many different forms.

I claim as my invention:

1. In a car truck, the combination of a brake beam, a resilient member secured to the transverse central portion of said brake beam and extending in opposite directions from said central portion of the brake beam, and rigid means, displaced from the transverse center of said beam, for slidably supporting said resilient member.

2. In a car truck, the combination of a brake beam, rigid members extending beneath said brake beam, on opposite sides of its transverse center, and a single spring member carried by said brake beam and resting upon said rigid members.

3. In a car truck, the combination of a brake beam, two rigid bars extending beneath said brake beam on opposite sides of its transverse center, and a single resilient member carried by said brake beam and resting slidably upon both of said fixed bars.

4. In a car truck, the combination of a brake beam, two rigid bars extending beneath said brake beam on opposite sides of its transverse center, and a resilient member having its mid-portion secured to said brake beam and having its ends provided with members resting slidably on said bars.

5. In a car truck, the combination of a trussed brake beam having a compression member and a tension member, two fixed bars extending beneath said brake beam on opposite sides of its center, and a spring member carried by the tension member of said brake beam and having its ends provided with members resting slidably on said bars.

6. In a car truck, the combination of a trussed brake beam having a compression member and a tension member, bars extending beneath said beam on opposite sides of its center and having upwardly inclined portions beneath said brake beam, a spring member conforming substantially to the shape of the tension member of said brake beam, means for attaching said spring member to said tension member, and depressions formed near the ends of said spring member and resting slidably on the upper surfaces of said bars.

7. In a car truck, the combination of a bar extending beneath the spring plank and brake beam of a railway car, and a housing for removably securing said bar to the under side of said spring plank, the said housing being provided with means for preventing said bar from moving either lengthwise or laterally.

8. In a car truck, the combination of a bar extending beneath the spring plank and brake beam of a railway car, and a housing for removably securing said bar to the under side of said spring plank, the said housing comprising a horizontal portion fixed to said spring plank, a vertical portion, and a second horizontal portion forming a seat for said bar, and bolts extending through openings in said spring plank and said housing, the said bolts also extending through notches formed in said bar.

In testimony whereof I, the said SOREN HANSSON, have hereunto set my hand.

SOREN HANSSON.